United States Patent [19]

D'Annessa et al.

[11] Patent Number: 5,169,422
[45] Date of Patent: Dec. 8, 1992

[54] METHODS FOR HEATING ELONGATED GLASS SUBSTRATE

[75] Inventors: Anthony T. D'Annessa, Marietta; Ray S. Elliott; Eugene A. Haney, both of Lawrenceville, all of Ga.

[73] Assignee: AT&T Bell Laboratories, Murray Hill, N.J.

[21] Appl. No.: 683,943

[22] Filed: Apr. 11, 1991

[51] Int. Cl.$^5$ .............................................. C03B 37/00
[52] U.S. Cl. .......................................... 65/3.12; 65/2; 65/12; 65/102
[58] Field of Search ................. 65/2, 12, 13, 102, 109, 65/110, 120, 244, 271, 292, 356; 239/132.3, 239, 552

[56] References Cited

U.S. PATENT DOCUMENTS

| | | | |
|---|---|---|---|
| 2,700,850 | 2/1955 | Dreshman | 49/50 |
| 3,876,149 | 4/1975 | Futerko | 239/398 |
| 4,231,777 | 11/1980 | Lynch et al. | 65/109 |
| 4,345,928 | 8/1982 | Kawachi et al. | 65/3.12 |
| 4,383,843 | 5/1983 | Iyengar | 65/2 |
| 4,401,267 | 8/1983 | Spainhour | 239/132.3 |
| 4,465,708 | 8/1984 | Fanucci et al. | 427/163 |
| 4,477,244 | 10/1984 | Nis et al. | 432/11 |
| 4,477,273 | 10/1984 | Lynch et al. | 65/3.12 |
| 4,486,214 | 12/1984 | Lynch et al. | 65/3.12 |
| 4,645,451 | 2/1987 | Schneider et al. | 431/278 |
| 4,820,322 | 4/1989 | Baumgart et al. | 65/3.11 |
| 5,028,246 | 7/1991 | Sarkar | 65/3.12 |

FOREIGN PATENT DOCUMENTS

| | | |
|---|---|---|
| 0357341 | 8/1989 | European Pat. Off. |
| 57-209840 | 12/1982 | Japan |
| 57-209841 | 12/1982 | Japan |

Primary Examiner—Robert L. Lindsay
Attorney, Agent, or Firm—E. W. Somers

[57] ABSTRACT

A glass tube (31) from which optical fiber is to be drawn is heated by a torch assembly comprising a plurality of nozzles (54—54) disposed on a carriage. In order to avoid contamination of the tube by particles of the torch assembly resulting from thermal degradation, the nozzles are disposed in a plane which is normal to an axis (36) of the tube with each nozzle axis inclined so that flame fronts associated with the nozzles are substantially closer to the tube than to the torch assembly. Reaction of materials which are flowed into the tube is enhanced by including a second row of nozzles (91—91) which are inclined within a plane which is inclined to the longitudinal axis of the tube. In order to collapse the tube into a rod, a muffle member (100) preferably is caused to be disposed about the tube with an opening in the periphery of the muffle member to allow portions of the gas flows to converge and to allow heat energy to be transferred from the flame fronts to the tube.

9 Claims, 6 Drawing Sheets

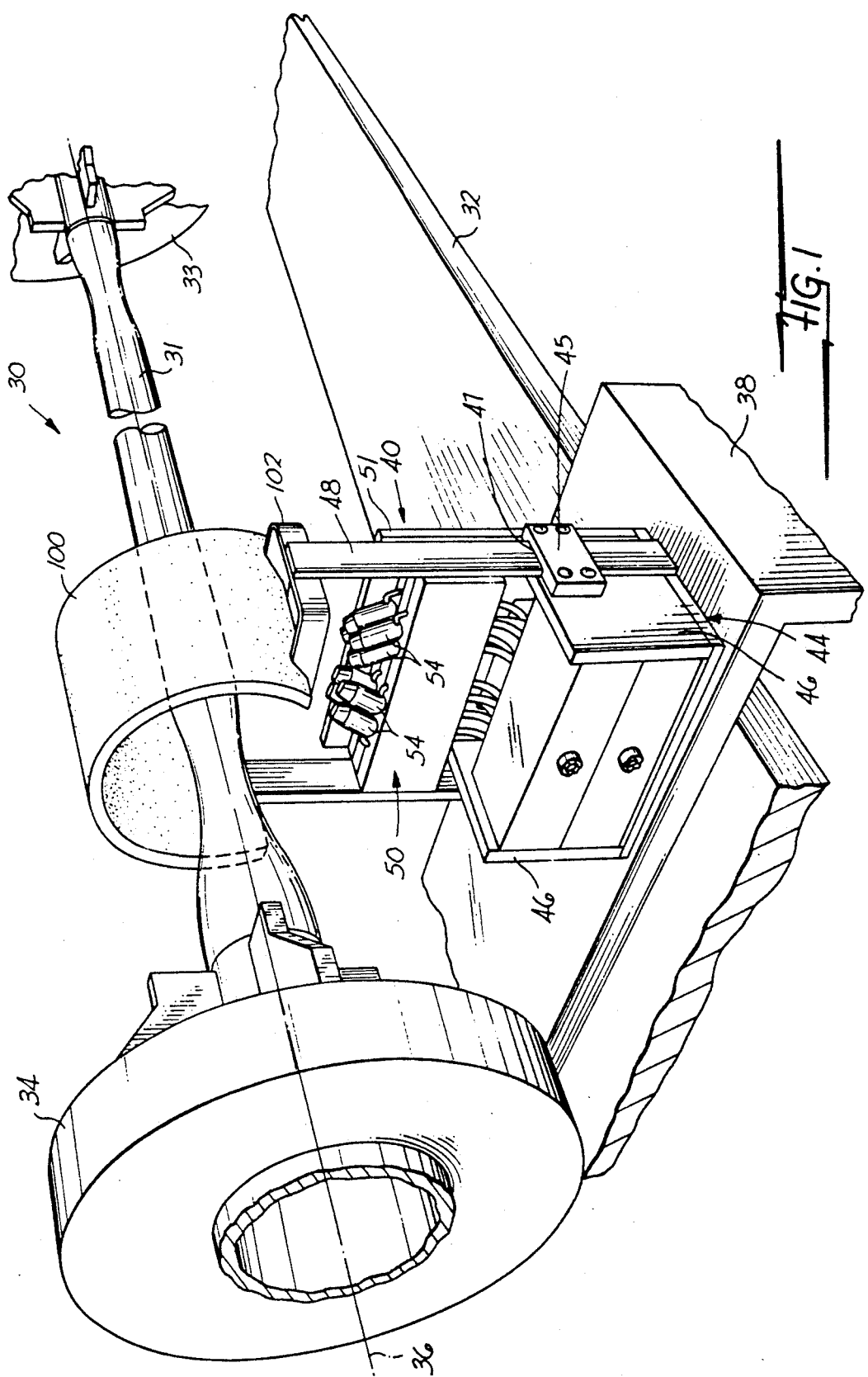

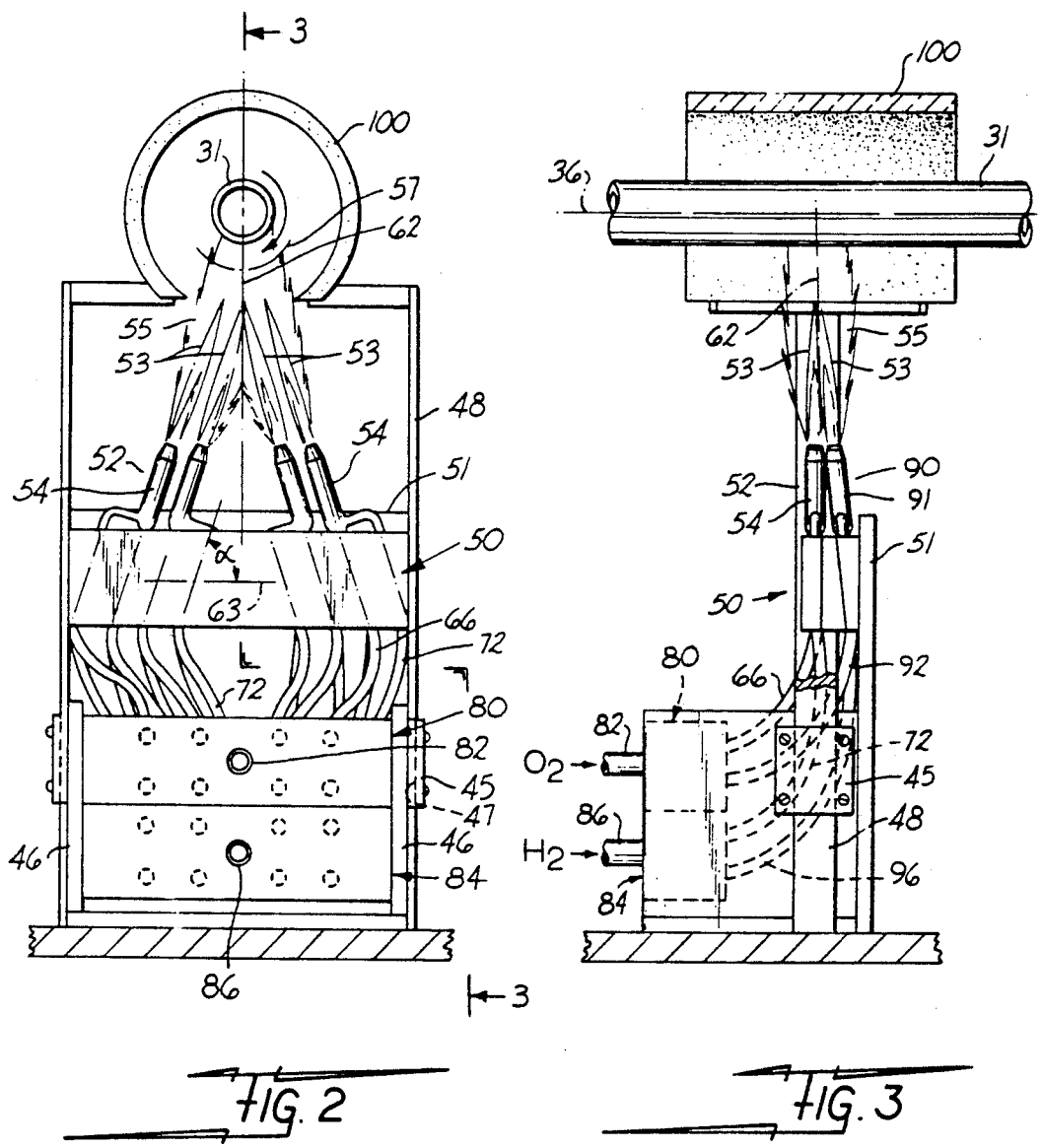

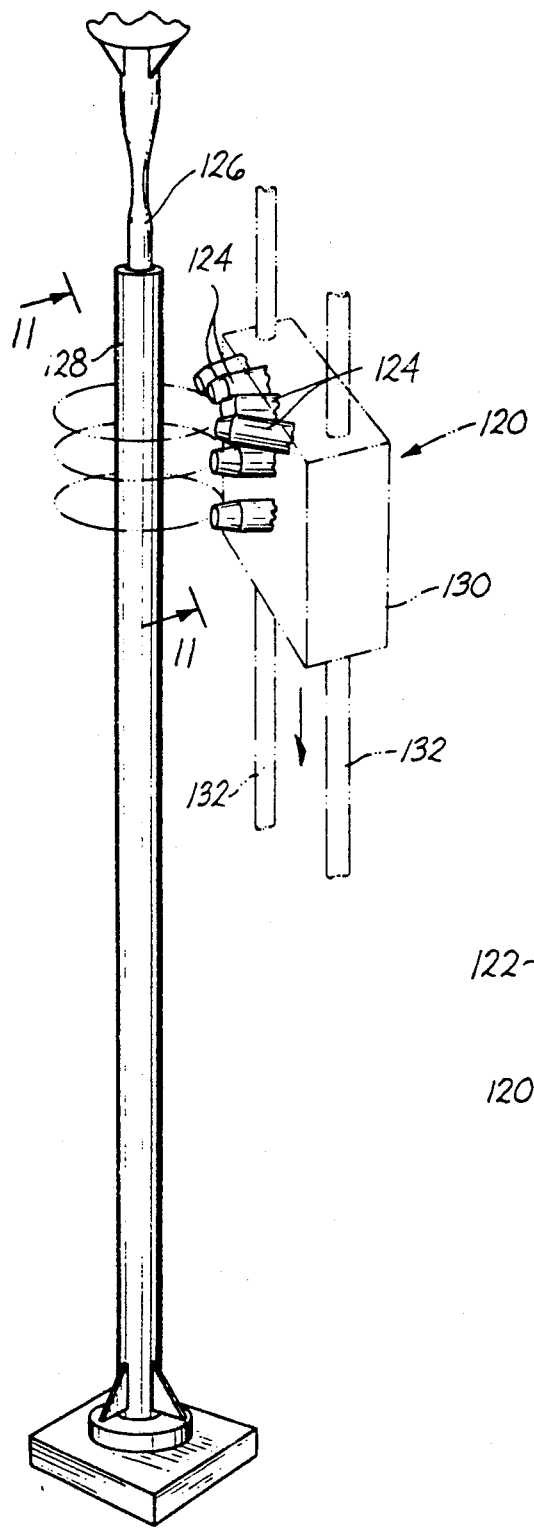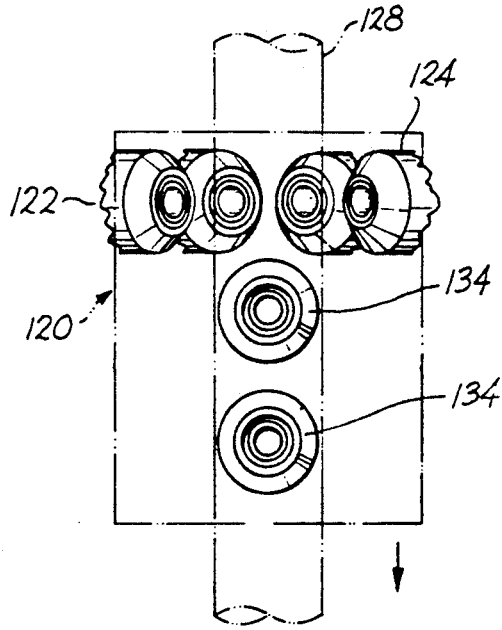
FIG. 10
FIG. 11

METHODS FOR HEATING ELONGATED GLASS SUBSTRATE

TECHNICAL FIELD

This invention relates to methods of and apparatus for heating an elongated glass substrate. More particularly, this invention relates to methods of and apparatus for heating glass substrate tubes to facilitate the deposition of materials thereon to provide preform tubes and to facilitate the collapse of the tubes into preform rods from which optical fiber is drawn.

BACKGROUND OF THE INVENTION

There are several different techniques for producing optical fiber for use in communications. One such technique comprises directing a constantly moving stream of reactants and oxygen through a glass substrate tube having a generally circular cross-section. The oxygen stream carries silicon tetrachloride and dopants to produce the desired index of refraction in the finished optical fiber. The substrate glass is heated to a reaction temperature within a moving hot zone that traverses the length of the tube, and the consequent reaction produces doped silicon dioxide fused into a continuous layer on the inner wall of the tube. The resulting tube is referred to as a preform tube. See for example, U.S. Pat. No. 4,217,027 which issued on Aug. 12, 1980 in the names of J. B. MacChesney and P. B. O'Connor. Subsequently, the preform tube is collapsed to provide a rod-like preform from which optical fiber is drawn.

A torch assembly, which typically is metallic, for heating a glass substrate tube to facilitate deposition of the reactants in the above-described process is disclosed, for example, in U.S. Pat. No. 4,231,777 which issued on Nov. 4, 1980, in the names of B. Lynch and F. P. Partus. See also U.S. Pat. No. 4,401,267 which issued on Aug. 30, 1983 in the name of C. D. Spainhour. Initially, one end of the tube is supported in the headstock of a lathe and the other end is welded to an exhaust tube that is supported in the tailstock. Combustible gases are directed through a housing and gas outlets which open to an arcuate surface of the torch assembly and toward the tube as it is turned rotatably about its longitudinal axis and as the torch assembly is moved therealong on a carriage to produce a moving hot zone. A temperature profile is produced across the hot zone which moves along on the surface of the tube to accomplish the desired reaction and deposition. See F. P. Partus, and M. A. Saifi "Lightguide Preform Manufacture" beginning at page 39 of the Winter 1980 issue of the *Western Electric Engineer*.

During a deposition mode, the torch carriage is moved slowly from the headstock of the lathe where dopants are moved into the glass tube to the tailstock where gases are exhausted. At the end of each pass from headstock to tailstock, the torch carriage is returned rapidly to the headstock for the beginning of another cycle. Ends of the gas outlets are cooled generally by water to eliminate substantially degradation by oxidation or reduction, for example, of the material forming the housing and gas outlets.

Subsequent to the deposition mode, a collapse mode is used to cause the preform tube to become a solid rod-like member which is called a preform. It is this preform from which lightguide fiber is drawn. See D. H. Smithgall and D. L. Myers "Drawing Lightguide Fiber" beginning at page 49 of the hereinbefore identified Winter 1980 issue of the *Western Electric Engineer*.

In order to collapse the preform tube, generally the torch assembly is moved in a number of passes from the headstock to the tailstock and in a plurality of passes from the tailstock to headstock. The temperature of the moving hot zone which is higher during the collapse mode than during the deposition mode softens the tube wall and allows surface tension to cause the tube to collapse into a rod. During the collapse mode, a straightening roller disclosed in U.S. Pat. No. 4,477,273 which issued on Oct. 16, 1984 in the names of B. Lynch and F. P. Partus has been used to engage the preform tube made with prior art torch assemblies to cause the resultant preform tube to be substantially straight.

Typically, torch assemblies which are used in the above-identified process for making a preform include a plurality of gas outlets which open to an arcuate surface which is disposed about a portion of the substrate tube. A flame front which is ahead of an oxygen cone and hydrogen sheath associated with each outlet and which provides the most useful heat energy for transfer to the substrate tube is substantially closer to the torch assembly than to the substrate tube.

One of the problems with the aforementioned apparatus is that portions of the metallic torch assembly oxidize as a result of the applied heat. This causes metal oxides particles to be carried from the torch assembly and deposited on and fused to the surface of the substrate tube. Such particles contaminate the resulting preform tube and may result in an undesirable number of fiber breaks during the process of drawing optical fiber from the preform.

There has been a desire to eliminate the contamination of the preform tubes with metallic particles. A solution to this problem will yield significant dividends as the elimination of such contamination should result in improved yields and longer draw lengths of optical fiber.

Seemingly, the prior art is devoid of a solution to this problem. An acceptable solution to this problem includes methods and apparatus which should be able to be used with present apparatus and which should be useable not only during the deposition process but also during the process of collapsing a preform tube to provide the preform from which optical fiber is drawn.

SUMMARY OF THE INVENTION

The foregoing problems of the prior art have been overcome with the methods and apparatus of this invention. A method of heating a glassy tube includes the steps of supporting a glassy tube, having a longitudinal axis, for rotation about its longitudinal axis. The method also includes providing a torch assembly to flow a plurality of jets of combustible gases toward and into engagement with the tube such that a flame front associated with each of the jets is a sufficient distance from the torch assembly to inhibit thermal degradation thereof. The tube is caused to be turned rotatably about its longitudinal axis. An outer surface of the tube is heated by directing a flow of combustible gases through passageways in the torch assembly to provide a zone of heat. The length of the tube is traversed with the zone of heat in a plurality of passes to facilitate deposition within the tube of reaction products of vaprous materials which are fed into the tube.

In one embodiment, a row of nozzles which are made of a material which is thermally non-degradable is disposed adjacent to the tube with the nozzles being disposed in a row which is transverse to the longitudinal axis of the tube and which are inclined to cause oxygen cones of the jets being flowed from the nozzles to converge in the vicinity of the tube. A second row of nozzles having longitudinal axes which fall in a plane which is inclined to the plane in which axes of the first row of nozzles are disposed may also be used.

Following deposition of reaction products within the substrate tube to provide a preform tube, the preform tube is collapsed to provide a rod-like preform from which optical fiber is drawn. A muffle member preferably is used to enclose a portion of the periphery of a portion of the length of the preform tube during the step of collapsing the tube into a preform rod to confine and reradiate heat energy.

BRIEF DESCRIPTION OF THE DRAWING

Other features of the present invention will be more readily understood from the following detailed description of specific embodiments thereof when read in conjunction with the accompanying drawings, in which:

FIG. 1 is a perspective view of an arrangement for heating an elongated glass tube to facilitate the reaction of vapor materials which are introduced into the tube;

FIG. 2 is an end view of the arrangement of FIG. 1;

FIG. 3 is a front elevational view partially in section of a portion of FIG. 2 taken along lines 3—3 thereof;

FIG. 10 is a perspective view of a torch assembly of this invention in use in a rod and tube apparatus; and FIG. 11 is a front elevational view of the torch assembly of FIG. 10.

DETAILED DESCRIPTION

Figure 4:
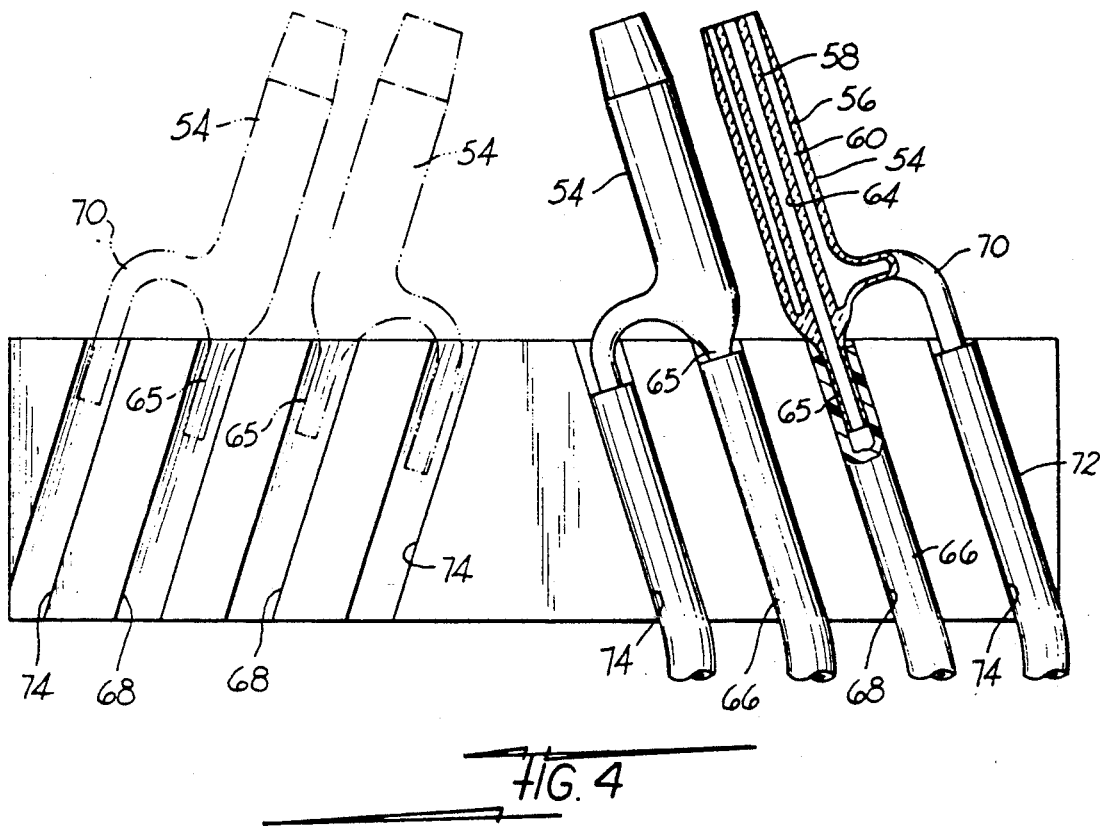
FIG. 4 is an enlarged view partially in section of a nozzle portion of the apparatus of FIG. 1.

Referring now to FIG. 1, there is shown an apparatus, designated generally by the numeral 30, for heating and collapsing a glass tube to manufacture a solid silica glass preform from which optical fiber is drawn. During a deposition mode, a substrate tube 31 is heated in order to cause reaction products of gases and/or dopants being fed into the tube to be fused to the inside wall thereof to provide a preform tube that when subsequently collapsed and drawn into optical fiber has an optically suitable profile for communications use. In this description, the numeral 31 is used to designate both the substrate tube and the preform tube. The heating of the glass substrate tube 31 is carried out while gas phase reactants are delivered to the tube. A system for this delivery is disclosed in U.S. Pat. No. 4,276,243 which issued on Jun. 30, 1981, in the name of F. P. Partus.

The apparatus 30 generally comprises a lathe 32 having a headstock 33 and a tailstock 34 which are used to support the glass starting tube 31 for rotation about its longitudinal axis 36. The lathe 32 also includes a carriage 38 which is mounted for reciprocal movement along the lathe axis. Mounted on the carriage 38 is a torch assembly which is designated generally by the numeral 40.

The torch assembly 40 is adapted to cause a flow of combustible gases to produce flames which are directed toward the tube 31. By confining the heat from the burning gases to a desired surface area of the tube, the torch assembly 50 establishes a zone of heat having a temperature profile at the surface of the tube. The mounting of the torch assembly 40 on the carriage 38 and its movement relative to the tube 31 causes the zone of heat, which may be referred to as a hot zone, to be moved along the length of the tube.

The torch assembly 40 includes a housing 44 having two support clips 45—45 attached to sidewalls 46—46 of the housing. Each support clip has a channel 47 therein through which extends a post 48. Between the posts 48—48 is a nozzle support assembly 50 (see FIGS. 2 and 3) which is mounted to a plate 51. The nozzle support assembly 50 which also is depicted in FIG. 4, is adapted to support at least one row 52 (see FIG. 2) comprising a plurality of nozzles 54—54.

Figure 5:
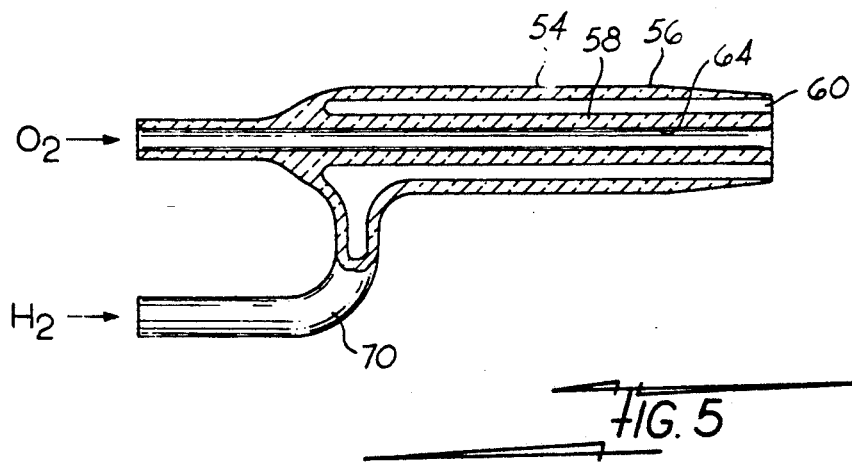
FIG. 5 is a detail view of one of the nozzles of FIG. 1.

Each nozzle 54 comprises an outer tubular portion 56 (see FIG. 5) having disposed therein a tubular member 58. The inner tubular member 58 is adapted to guide a flow of oxygen toward the preform tube whereas an annular space 60 between an outer surface of the tubular member 58 and an inner surface of the outer tubular portion 56 is adapted to direct hydrogen or other fuel gas toward the preform. Oxygen is flowed from each tubular member 58 in a form referred to as a cone and designated with the numeral 53 (see FIG. 2). Each oxygen cone is surrounded laterally by a hydrogen sheath 55. Each oxygen cone and its associated hydrogen sheath is referred to as a jet. A flame front 57 which is the most useful part of each jet in transferring heat energy to the substrate tube and which is associated with each jet is formed ahead of a tip of each oxygen cone.

As can best be seen in FIGS. 2 and 3, the nozzles 54—54 in the at least one row 52 have an orientation such that the nozzles direct the combustible gases toward the preform tube. Further desired is that the confluence of the oxygen cones from the nozzles is a distance from the nozzles which is sufficient to inhibit thermal degradation of the nozzle. In other words, the arrangement is such that a flame front associated with each oxygen and hydrogen jet is substantially closer to the substrate tube than to the nozzle. This is unlike the prior art torch assemblies such as in U.S. Pat. No. 4,231,777 in which the flame fronts are substantially closer to the arcuate surface to which the gas outlets open than to the tube. Such a prior art arrangement has resulted in thermal degradation of the nozzles and/or torch assembly. In order so to direct the gases, each of two of the nozzles on one side of a centerline 62 is inclined at an acute angle $\alpha$ to a horizontal axis 63 whereas the two nozzles on the other side of the centerline also are disposed at an acute angle $\alpha$ thereto.

Desirably, the nozzles can be adjusted as to their distance from the tube 31. The jets are brought closer, for example, for a smaller diameter tube. It is desired to keep the oxygen cones of the jets spaced from the tube 31, yet achieve desired heat intensity. In the preferred embodiment, the tips of the nozzles are spaced in a range of standoff distances from about 5 to 8 cm from the outer surface of the tube 31. This contrasts with about 3.8 cm for the metal torch of the prior art. If the distance is less than or greater than the range for gas flows in a range of interest, difficulties may be encountered in achieving suitable heat energy at the surface of the tube. Most mixing occurs ahead of the oxygen cone of the flame which is the high velocity portion of the flame. If the flows were increased without increasing the standoff distances, the preform tube may be cooled with unreacted oxygen.

Figure 7:
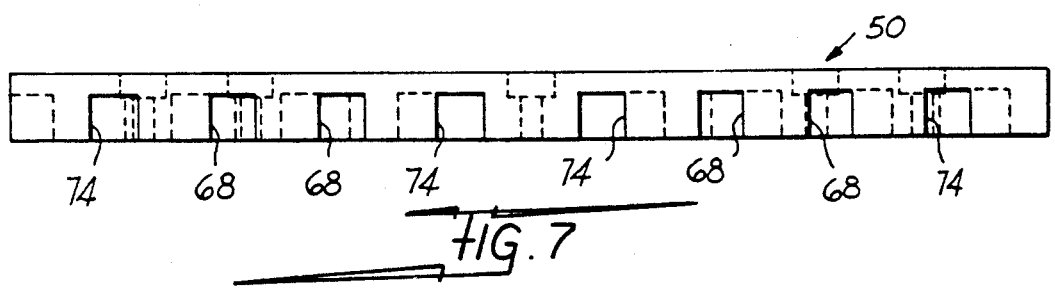
FIG. 7 is a plan view of the nozzle support assembly of FIG. 6.
Figure 6:
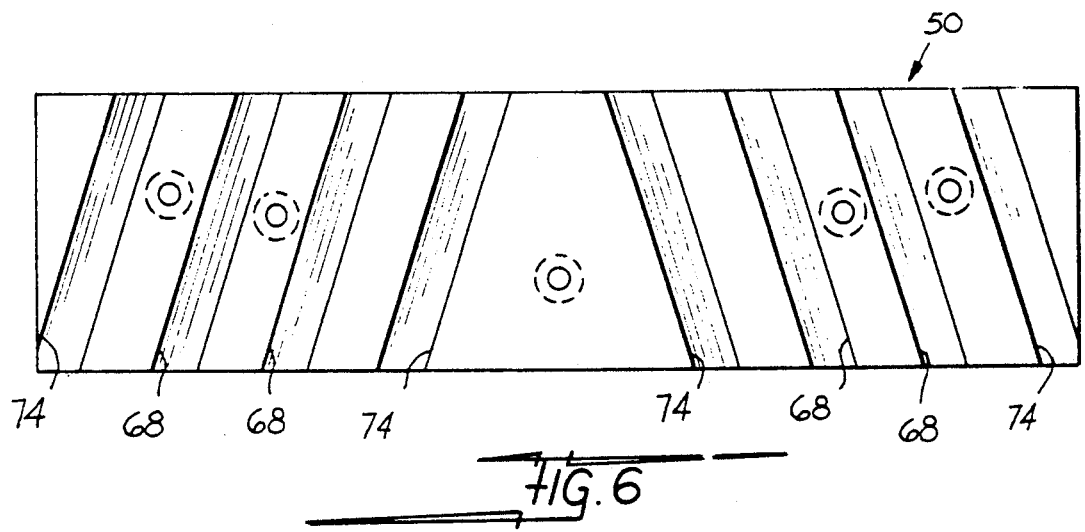
FIG. 6 is an elevational view of a nozzle support assembly.

A mounting arrangement of the nozzles 54—54 is depicted in FIG. 4. As can be seen, each passageway 64 of each inner tubular member 58 extends through a tubular portion 65 which is connected to a supply conduit 66 which is disposed in a passageway 68 of the support assembly 50 (see also FIGS. 6 and 7). The supply conduit 66 is connected to a source of oxygen. Extending laterally of the tubular members and connected to the annular chamber 60 therebetween is a conduit 70 which is connected to a supply conduit 72 connected to a supply of hydrogen. Each supply conduit 72 is disposed within a passageway 74 in the nozzle support assembly 50. Each of the supply conduits 66 and 72 fits snugly within its associated passageway in the nozzle support assembly.

The angle of inclination of each of the nozzles 54—54 and the spacing of the free ends of the nozzles from the substrate tube 31 is such as to cause the flame 57 front of the interacting gases of each nozzle to engage the substrate tube. The flame front 57 of each nozzle generally is a blue portion which is out in front of the oxygen cone 53. The tip of the oxygen cone is below the substrate tube 31; however, the distance from the tip of the oxygen cone is controlled. If that distance is too great, insufficient heat energy is provided.

As can be seen in FIG. 3, the conduits 66—66 from the nozzles 54—54 extend to a manifold which is designated generally by the numeral 80. The manifold 80 is connected by a supply line 82 to a source of oxygen. Further, in order to provide the hydrogen sheath around each oxygen cone, each of the supply conduits 72—72 extends to a manifold which is designated generally by the numeral 84. Connected to the manifold 84 is a supply line 86 which extends to a supply of hydrogen.

Preferably, the torch assembly 40 also includes a second row 90 of nozzles 91—91 (see FIG. 3). Each of the nozzles 91—91 also has a conduit 92 which extends to the oxygen manifold 80 and a conduit 96 which extends to the hydrogen manifold 84.

As should be observed in FIG. 3, the nozzles 91—91 have longitudinal axes which are inclined to a vertical axis of the torch in a plane which is parallel to a plane which includes the axis 36 of the preform. This arrangement is unlike the arrangement for the nozzles 54—54, the longitudinal axes of which are vertical as seen in FIG. 3. However, similar to the nozzles 54—54, the nozzles 91—91 are such that two of the nozzles 91—91 to one side of the centerline 62 of the torch assembly 40 are inclined in one direction, as seen for the nozzles 54—54 in FIG. 2, whereas the other two nozzles of the row 90 are inclined in an opposite direction to the vertical axis of the torch assembly. The inclination of the nozzles 91—91 in a plane which is parallel to a longitudinal axis of the preform tube 31 is done in order to achieve a confluence of the jets. If the nozzles 91—91 also were vertical in the plane parallel to the longitudinal axis of the preform tube 31, a pronounced double zone of heat would be established. What is desired is a substantially single zone of heat having a relatively high intensity of heat energy.

Advantageously, each of the nozzles 54—54 and 91—91 may be made of a material which is substantially thermally non-degradable. Such a material which has a high thermal degradation resistance is a clear fused silica, for example. As such, each is heat resistant and further there is no flaking of particles which could become embedded in the surface portion of the substrate tube. Further, no cooling of the nozzles is required.

Figure 8:
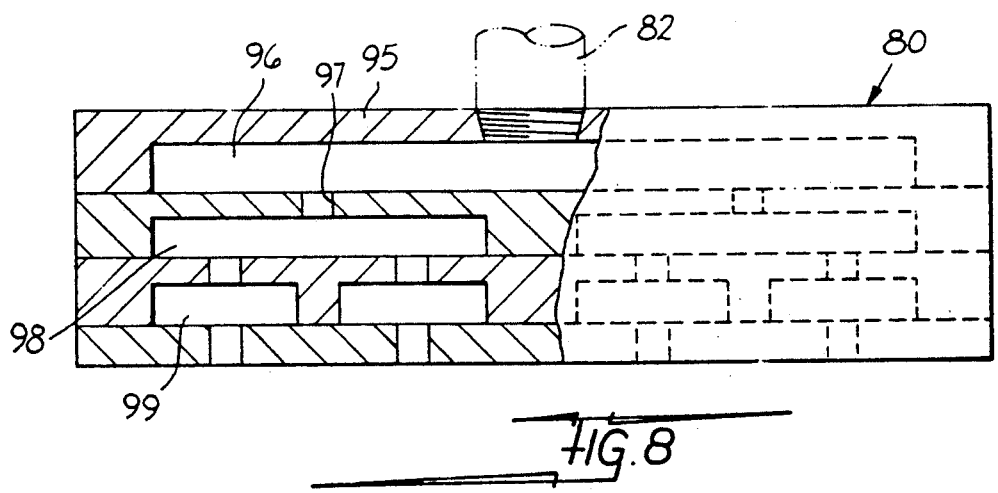
FIG. 8 is a plan view partially in section of a manifold.

Also important is the distribution of the oxygen and hydrogen gases in the manifolds 80 and 84, respectively, to the conduits which extend to the nozzle support assembly and thence to the nozzles. As can be seen in FIG. 8, the manifold 80 includes a wall portion 95 having an opening for receiving the supply line 82. The supply line 82 opens to a chamber 96 which communicates through two openings 97—97 to two chambers 98—98. Each chamber 98 communicates through two openings to chambers 99—99 into which extend the conduits 66—66 which supply oxygen to the nozzles. The manifold 84 has a similar construction. As a result of this construction, the flow of the gas is substantially equalized among the conduits which extend to the nozzles.

The arrangement described thus far is capable of providing sufficient heat energy to the preform to cause reactions to occur within the substrate tube as vaporous materials are fed thereinto, resulting in the desired deposition of reaction products. However, in order to collapse the resulting preform tube following deposition, the apparatus during collapse is provided with a muffle member 100 (see FIGS. 1-3).

The muffle member 100 cooperates with the nozzles of the torch assembly to provide sufficient heat energy to cause a collapse of the preform tube. As can be seen in FIGS. 1, 2 and 3, the muffle member is circular in cross section with a portion removed to allow it to become disposed about the tube 31 and is mounted on brackets 102—102 which are supported from the posts 48—48. The muffle member which preferably is made of a ceramic material is supported by such that it is centered in the longitudinal direction along the preform tube around the row or rows of the nozzles of the torch assembly and is disposed somewhat concentrically about the preform tube.

Advantageously, the muffle member 100 which preferably is made of ROTOSIL ® opaque silica provides reradiation of heat energy and creates a uniform pressure field. Further, the muffle member has a centralizing effect on the preform tube to maintain it on center.

The foregoing arrangement is advantageously because it has a self-centering effect. It keeps the preform straight. As a result, a contacting straightening roller such as was disclosed in hereinbefore-identified U.S. Pat. No. 4,477,273 is no longer required. The jets emitting from the nozzles effectively provide lift for the tube and prevent sagging. Because the need for contacting the preform tube with a roller has been obviated, a higher quality preform tube is obtained.

Because of the excellent straightness of the collapsed preform tube, substantial concentricity of the deposited portion with the substrate tube is achieved. Also, preforms can be made more quickly. Further, the torch assembly 40 of this invention uses less oxygen and hydrogen because less time is required to collapse the preform tube.

What is desired and what is achieved is temperature control and a uniform pressure field around the tube so that straightness is achieved without the use of rollers.

The flow rates of the torch assembly are greater than those of a metal torch of the types referred to under Background of the Invention. However, total run time for preform deposition has been reduced by about 1.5 hours with no contamination caused by flaking particles.

Another advantage of the torch assembly of this invention is that water cooling of the nozzles is unnecessary. As is well known and as was mentioned hereinbefore, metal torches of the prior art required water cooling.

Although the muffle member 100 is particularly suited for use during the step of collapsing the preform tube 31, it also may be used during deposition to reduce effectively the time required for deposition. Also, for relatively thick deposition layers, a control system for supplying gases may call for too much hydrogen. The call for more hydrogen would be accompanied by more oxygen which could cause the tip of the oxygen cone, undesirably, to touch and hence cool the preform tube. Also, as more oxygen is flowed, the flame front associated with each jet is intercepted by the preform tube, resulting in lower applied heat energy.

Figure 9:
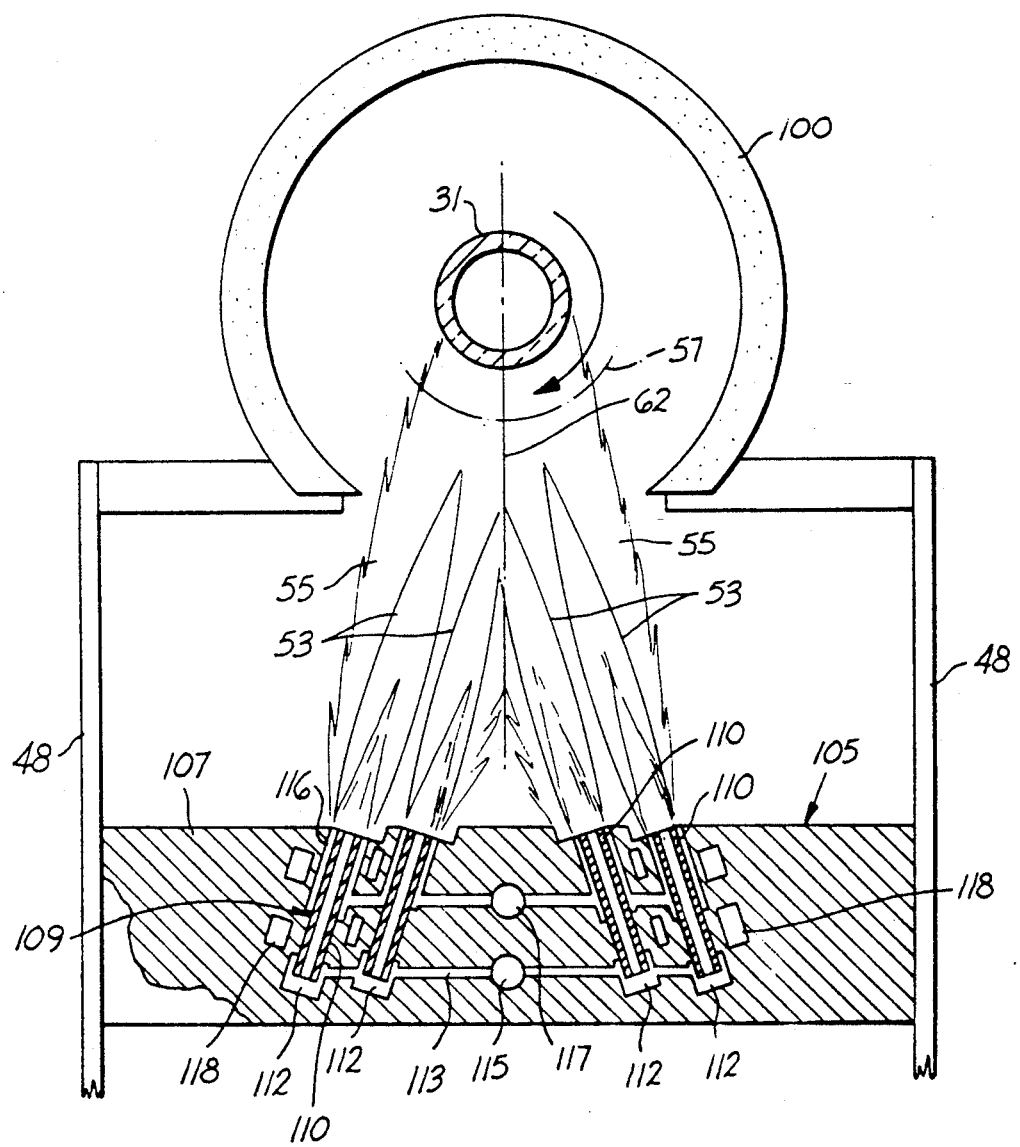
FIG. 9 is an elevational view partially in section of another embodiment of a torch assembly of this invention.

Viewing now FIG. 9 where is shown an alternative embodiment of a nozzle arrangement of this invention. Supported between the posts 48—48 is a nozzle support assembly which is designated generally by the numeral 105 and which may be made of metal. The nozzle assembly 105 includes a housing 107 having four nozzle arrangements 109—109 disposed about the centerline 62. Each nozzle arrangement includes an inner tubular member 110 which opens to a lower chamber 112. The chambers 112—112 associated with the tubular members 110—110 are connected by conduits 113—113 to a source 115 of oxygen. Disposed about an upper portion of each of the tubular members 110—110 is an annulus 116 with the annuli associated with the four nozzles connected to a source 117 of hydrogen. Also provided in the nozzle assembly 105 are ducts 118—118 which are connected to a source of coolant.

In the embodiment of FIG. 9, as in the preferred embodiment, the nozzle arrangement is such that a flame front associated with each oxygen-hydrogen jet is substantially closer to the substrate tube 31 than to the nozzle support assembly. Such an arrangement supplemented by cooling of the nozzle assembly 105 prevents thermal degradation of portions of the torch assembly.

The present invention also may be used in a process in which a tube is collapsed onto a rod to provide a preform. Such a process which commonly is referred to as a rod and tube process is disclosed in U.S. Pat. No. 4,820,322 which issued on Apr. 11, 1989 in the names of J. M. Baumgart, A. T. D'Annessa, Franz T. Geyling, W. M. Flegal, and T. J. Miller. In such an embodiment, which is shown in FIG. 10, it should be observed that a muffle member is not necessary.

A torch assembly 120 for use in a rod and tube process is depicted in FIG. 10. As in the torch assembly 40, the torch assembly 120 includes one row 122 (see also FIG. 11) of nozzles 124—124. The nozzles 124—124 are arranged as are the nozzles 54—54 with their axes in a plane which is normal to the axes of a rod 126 and a tube 128. In that plane, two of the nozzles 124—124 are inclined in one direction to the centerline of the row of torches whereas the nozzles on the other side of the centerline are inclined in the opposite direction. The nozzles are mounted on a carriage 130 which is mounted for movement along two vertically disposed guide rods 132—132.

The torch assembly 120, also includes an additional two nozzles 134—134 (see FIG. 11) which are used for preheating the tube 128 and the rod 126 ahead of the row 122 of nozzles. The two nozzles 134—134 are arranged along a line which passes through a center of the row 122 of nozzles 124—124 and which is parallel to the longitudinal axes of the tube 128 and of the rod 126.

It is to be understood that the above-described arrangements are simply illustrative of the invention. Other arrangements may be devised by those skilled in the art which will embody the principles of the invention and fall within the spirit and scope thereof.

We claim:

1. A method of heating a glassy tube, said method including the steps of:
   supporting a glassy tube having a longitudinal axis for rotation about its longitudinal axis;
   providing a torch assembly which includes a row comprising a plurality of nozzles with longitudinal axes of the nozzles being disposed in a plane which is normal to the longitudinal axis of the glassy tube, the row having a centerline which intersects the longitudinal axis with the nozzles on each side of the centerline being inclined to the centerline to cause the nozzles to be directed toward the glassy tube, and to cause the confluence of portions of flows of combustible gases from the nozzles to be such as to inhibit thermal degradation of the nozzles by having a flame front generated by each of the nozzles substantially closer to the glassy tube than to the corresponding nozzle;
   causing the tube to be turned rotatably about its longitudinal axis;
   heating an outer surface of the tube by directing a flow of combustible gases through each nozzle of the torch assembly toward the portion of the length of the tube which is aligned with the torch assembly to provide a zone of heat; and
   traversing the length of the tube with the zone of heat in a plurality of passes.

2. The method of claim 1, wherein each of the nozzles is cooled during the step of flowing combustible gases therethrough.

3. The method of claim 1, wherein the row of nozzles is a first row of nozzles, said step of providing also includes providing a second row of nozzles the longitudinal axes of which are disposed in a plane which is oblique to said plane in which are disposed the first row of nozzles in such a manner that portions of jets of combustible gases which are passed through the nozzles and directed toward the tube converge at the tube, the axis of each said nozzle in said second row being inclined to a centerline axis of said second row which intersects the longitudinal axis of the tube.

4. The method of claim 1, which also includes the step of causing a substantial portion of the zone of heat to be confined by confining a substantial portion of the circumference of the tube along a portion of the length of the tube which is adjacent to each side of the row of nozzles.

5. The method of claim 1, wherein each of said nozzles being made of a material which is substantially thermally non-degradable.

6. The method of claim 5, wherein each of said nozzle is made of a quartz material.

7. The method of claim 1, wherein an end of each nozzle from which gases emerge is spaced in the range of about 5 to 8 cm from an outer surface of the tube.

8. The method of claim 3, wherein an end of each nozzle from which gases emerge is spaced in the range of about 5 to 8 cm from an outer surface of the tube.

9. A method of making optical fiber, said method including the method of claim 1 and further including the steps of:

flowing gases into the glassy tube while the tube is being heated to cause the gases to form reaction products which are deposited on an inner wall of the tube;

after a desired deposition of reaction products has occurred, causing the tube to be collapsed to provide a preform rod; and drawing optical fiber from the rod.

* * * * *